US008132864B2

(12) United States Patent
Blackmon et al.

(10) Patent No.: US 8,132,864 B2
(45) Date of Patent: Mar. 13, 2012

(54) CHILD SAFETY SEAT WITH EMERGENCY HARNESS RELEASE

(76) Inventors: Michael M. Blackmon, Rome, GA (US); Daniel T. Daly, Tuscaloosa, AL (US); Ryan D. Nelms, Manchester, CT (US)

( * ) Notice: Subject to any disclaimer, the term of this patent is extended or adjusted under 35 U.S.C. 154(b) by 176 days.

(21) Appl. No.: 12/268,378

(22) Filed: Nov. 10, 2008

(65) Prior Publication Data

US 2009/0134678 A1 May 28, 2009

Related U.S. Application Data

(63) Continuation-in-part of application No. 11/879,984, filed on Jul. 19, 2007, now Pat. No. 7,448,690.

(60) Provisional application No. 60/832,031, filed on Jul. 20, 2006, provisional application No. 60/834,972, filed on Aug. 2, 2006, provisional application No. 61/011,024, filed on Jan. 14, 2008.

(51) Int. Cl.
*B60R 22/00* (2006.01)
(52) U.S. Cl. ............ 297/484; 297/216.11; 297/250.1
(58) Field of Classification Search .......... 297/484, 297/250.1, 216.11, 254
See application file for complete search history.

(56) References Cited

U.S. PATENT DOCUMENTS

| | | |
|---|---|---|
| 3,034,596 A | 5/1962 | Twaits, Jr. |
| 3,524,679 A | 8/1970 | De Lavenne |
| 3,757,744 A | 9/1973 | Pravaz |
| 3,910,634 A | 10/1975 | Morris |
| 3,938,859 A | 2/1976 | Henderson |
| 4,063,778 A | 12/1977 | Chika |
| 4,342,483 A | 8/1982 | Takada |
| 4,738,413 A | 4/1988 | Spinosa et al. |
| 5,007,678 A | 4/1991 | DeKraker |
| 5,082,325 A | 1/1992 | Sedlack |
| 5,511,856 A | 4/1996 | Merrick et al. |
| 5,524,965 A | 6/1996 | Barley |
| 5,562,326 A | 10/1996 | Stroud |
| 5,580,126 A | 12/1996 | Sedlack |
| 5,582,462 A | 12/1996 | Shea |
| 5,730,498 A | 3/1998 | Hanson et al. |
| 5,733,003 A | 3/1998 | Goor |
| 6,030,047 A | 2/2000 | Kain |
| 6,338,529 B1 | 1/2002 | David et al. |

(Continued)

FOREIGN PATENT DOCUMENTS

GB 1182752 3/1970

*Primary Examiner* — Anthony D Barfield
(74) *Attorney, Agent, or Firm* — Alvin T. Rockhill

(57) ABSTRACT

The present disclosure discloses a child safety seat comprising: (a) a supporting base structure adapted to be secured to a vehicle seat; (b) a child seating surface wherein the seating surface comprises a seat bottom and a seat back, and wherein the seat back has disposed therein at least one pair of laterally spaced shoulder belt restraints; (c) a child harness wherein the harness comprises a pair of shoulder belts running from the restraints in the seat back to a seat bottom locking tongue, each shoulder belt having a restraint engaging means affixed to an extreme end of the belt for insertion into the laterally spaced pair of restraints in the seat back, and a buckle affixed to the front center portion of the seat bottom for receiving the seat bottom locking tongue; and (d) an emergency means of disengaging at least one of shoulder belts from at least one of the restraints in the back of the seat, the disengaging means being actuated from the rear face or side of the seat.

20 Claims, 8 Drawing Sheets

U.S. PATENT DOCUMENTS

| | | |
|---|---|---|
| 6,382,722 B2 | 5/2002 | Burleigh |
| 6,457,774 B2 | 10/2002 | Baloga |
| 6,471,298 B2 | 10/2002 | Carine et al. |
| 6,491,348 B1 | 12/2002 | Kain |
| 6,520,579 B2 | 2/2003 | Kassai et al. |
| 6,566,869 B2 | 5/2003 | Chamings et al. |
| 6,623,075 B2 | 9/2003 | Baloga et al. |
| 6,626,493 B2 | 9/2003 | Kain |
| 6,679,550 B2 | 1/2004 | Goor et al. |
| 6,742,848 B2 | 6/2004 | Ruff |
| 6,799,799 B2 | 10/2004 | Maier et al. |
| 6,811,186 B1 | 11/2004 | Fraley et al. |
| 6,827,399 B2 | 12/2004 | Schoor et al. |
| 6,898,811 B2 | 5/2005 | Zucker et al. |
| 6,971,718 B2 | 12/2005 | Haglund |
| 7,029,069 B2 | 4/2006 | Hendren et al. |
| 7,044,549 B2 | 5/2006 | Maier et al. |
| 7,387,336 B2 | 6/2008 | Sakumoto |
| 7,448,690 B2 | 11/2008 | Blackmon |
| 2007/0200404 A1 | 8/2007 | Canna et al. |
| 2008/0018156 A1 | 1/2008 | Hammarskjold et al. |

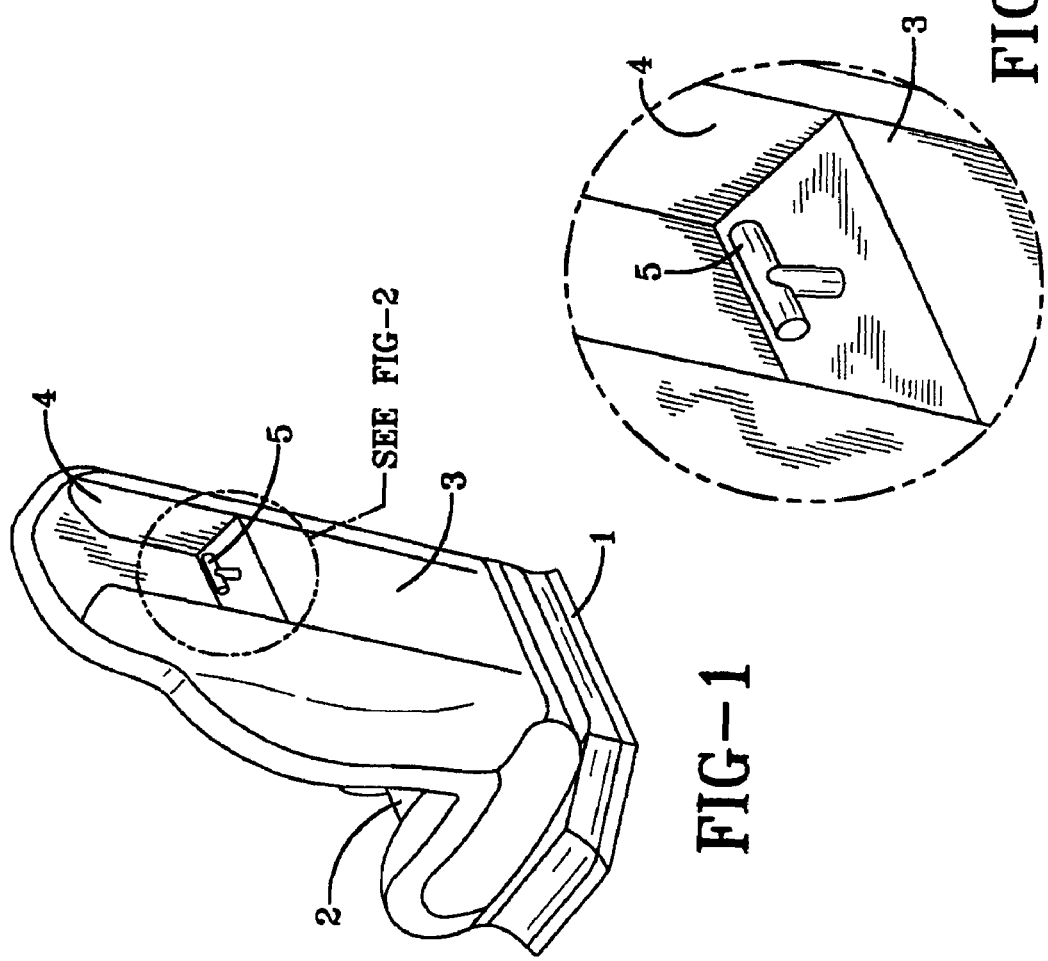

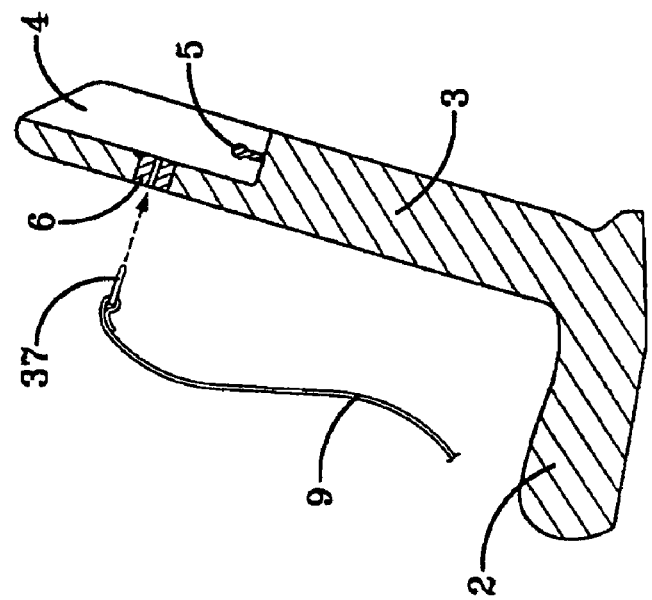
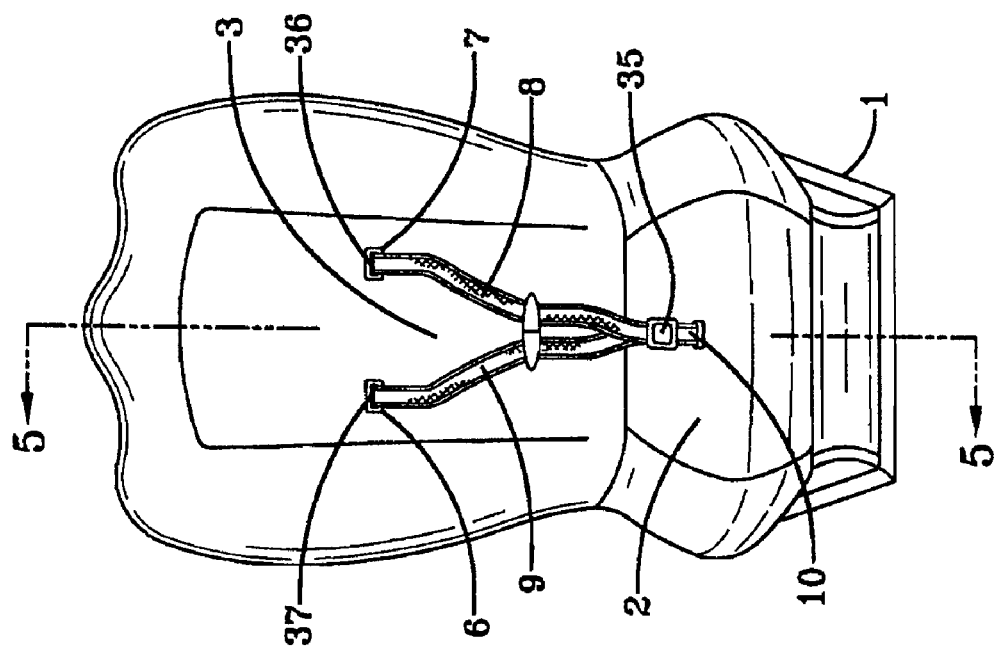

CHILD SAFETY SEAT WITH EMERGENCY HARNESS RELEASE

CROSS REFERENCE TO RELATED APPLICATIONS

This application claims priority to U.S. Provisional Patent Application 61/011,024 entitled "Child Safety Seat with Emergency Harness Release," and filed on Jan. 14, 2008, by Blackmon, Daly, and Nelms. This application is a continuation-in-part of U.S. Pat. No. 7,448,690, entitled "Child Safety Seat with Emergency Harness Release," and issued on Nov. 11, 2008. U.S. Pat. No. 7,448,690 claims priority to U.S. Provisional Patent Application No. 60/832,031, filed on Jul. 20, 2006, and U.S. Provisional Patent Application No. 60/834,972, filed on Aug. 2, 2006. Each of the foregoing patent and patent applications is incorporated herein by reference.

FIELD OF THE DISCLOSURE

The present disclosure relates generally to child safety seats for use in vehicles for restraining a child passenger in the vehicle in case of a collision. More particularly, the present disclosure discloses a child safety seat for children between one and four years old wherein a simple, easy to use emergency release mechanism is utilized to quickly release the shoulder restraint straps of a harness system in an emergency. The present disclosure will allow a child who is restrained in a child safety seat to be removed quickly and safely from the vehicle after an accident by any person, even those unfamiliar with the child safety seat and its fastening mechanisms.

BACKGROUND OF THE DISCLOSURE

It is generally accepted that conventional safety belts and harnesses designed for adult passenger usage in automobiles are not sufficient to protect a child in the case of an accident or collision. Child safety seats are widely used in order to adequately restrain children and prevent serious injury or death resulting from a collision. Almost all states now require child restraints for children until they are at least four years of age, and some states require child restraints for children up to eight years of age. Conventional child safety seats usually consist of a small plastic shell-type seat having a padded cover and are fitted with a 5 point restraint belt system composed of a pair of shoulder belts, a waist belt and a crotch belt. Because children vary considerably in size as they grow from infancy, the belts are typically adjustable.

Many of the conventional belt systems used in conjunction with child safety seats are relatively complicated and difficult to use. Inexperienced users frequently find securing a child into the safety seat to be a challenging task. In many of the prior art devices the buckle used for fastening the multitude of belts around the child is located in such a position that it is difficult to fasten and unfasten. Some existing devices have been designed in an attempt to alleviate these problems in conventional child safety seat designs. Most prior art devices have been designed to provide reliable protection to the child during a collision or automobile accident. The child safety seats described and shown in U.S. Pat. Nos. 7,044,549; 7,029,069; 6,971,718; 6,827,399; 6,799,799; 6,679,550; 6,623,075; 6,520,579; 6,471,298; 6,382,722; 5,733,003; 4,342,483; and 3,938,859 are representative of the prior art.

U.S. Pat. No. 5,524,965 is typical of the prior art devices available. More specifically, U.S. Pat. No. 5,524,965 discloses a child safety seat in combination with an adult vehicle seat for a motor vehicle with a seat portion and a backrest portion. This child safety seat comprises: a support structure, a seat body having first and second abutment surfaces which are alternatively engageable with the support structure to support the seat body at respective first and second angles to the support structure, first releasable coupling means arranged to provide a rigid connection between the support structure and the motor vehicle, upwardly facing abutment means on the support structure positioned above the seat portion of the adult vehicle seat and in front of the backrest portion thereof, second coupling means arranged to hold the first abutment surface in rigid abutment with the support structure only when the seat body is facing rearward in the vehicle and to hold the second abutment surface in rigid abutment with the support structure only when the seat body is facing forwardly in the vehicle.

U.S. Pat. No. 6,457,774 is also typical of the prior art devices. It discloses a child safety seat comprising: a seat body having a seat back, a harness for a child occupant of the seat secured to the seat body and including a pair of shoulder straps extending through respective slots in the seat back and a respective lap strap connected to each shoulder strap, a respective shoulder pad slidably mounted on each shoulder strap, each shoulder pad having an upper loop attached to its upper end and a lower loop attached to its lower end, the corresponding shoulder strap being threaded through said upper and lower loops, a buckle interconnecting the lap straps at their junctions with the shoulder straps, a separable link assembly having a first link part slidably mounted on one shoulder strap between its upper and lower loops and a second link part slidably mounted on the other shoulder strap between its upper and lower loops, the first and second link parts having interlocking formations adapted to engage with one another, and a respective fixed-length tether connected to the upper end of each shoulder pad and extending through its respective slot to an anchorage behind the seat back.

These prior art devices, along with the other available devices, are deficient in that little consideration has been given to the safety of a child restrained in the child safety seat after an automobile accident. Conventional designs focus on the safety of a child during an accident, and may be adequate in protecting a child from serious injury or death in that respect. However, a child may remain in danger after the forces of a collision have ceased acting on the vehicle and the passengers inside the vehicle. There is often a risk of explosion due to gasoline fumes after an automobile accident, as well as the risk of fire. Also, there is a risk that a child may be injured from the accident and need immediate emergency medical care. Because of these post-collision risks and dangers, it is imperative that a child can be easily removed from the child safety seat restraints in a rapid manner. In cases where the vehicle is actually on fire the need to remove the child from the safety seat without delay is absolutely critical. The pressures and anxieties associated with an accident will only make it more likely that a parent or rescuer will struggle when attempting to release the child's restraints. Parents attempting to free a child may themselves be injured from the accident and therefore be operating in a diminished capacity. Rescue personnel may have significant difficulty in removing the child from the child safety seat because they do not have experience with the device. These risks are significantly higher when there are several children secured into child safety seats in a vehicle that has been involved in an accident. Because the safety seat harnesses may differ in design, and due to the increased lack of space inside the vehicle, there is a greater chance that a parent or rescuer will encounter difficulties with the harness release mechanisms. Also, there exists a risk that the latches of the child safety seat restraints will become damaged or stuck during the accident, making it extremely difficult, if not impossible, to safely remove the child from the accident scene. There is a long-felt and yet unanswered need for an improved child safety seat that allows for quick and easy removal of a child in an emergency situation.

SUMMARY OF THE DISCLOSURE

The child safety seats of the present disclosure alleviate the heretofore mentioned concerns and risks associated with the design of prior art devices. This disclosure discloses an improved child safety seat including an emergency release mechanism to quickly free a child from the child safety seat restraints. The child safety seat of this disclosure is of great benefit in cases where only one child is traveling in a vehicle and can be of even more value in cases where multiple children (twins, triplets, siblings of different ages, friends, etc.) are being transported in a vehicle. The emergency release mechanism is separate and distinct from the conventional harness release mechanism, and when actuated releases the shoulder straps of the harness system from the rear of the child safety seat, allowing fast and easy removal of the child from a vehicle accident scene.

The present disclosure pertains to a child safety seat for use in a vehicle having an emergency release mechanism to allow a child to be quickly and easily removed from a vehicle after a collision or accident. The release mechanism may be of any conventional design, including buttons, knobs, levers and sliding handles. The release mechanism is located on the rear face of the child safety seat so as to prevent a child restrained in the seat from being capable of actuating the mechanism. A recess in the seat back allows the mechanism to be accessed even where the child safety seat back is flush with the vehicle seat back. The mechanism, when actuated, acts to disengage the buckle tongues affixed to the shoulder restraint belts of the harness system from buckles located within the seat back.

The child safety seat of the present disclosure may also include means of adjustability so that the child safety seat may be used safely and comfortably by children of various sizes. The child safety seat may include multiple pairs of buckles located within the seat back to provide adjustability. Alternatively, the child safety seat may be equipped with an adjustable fastening piece mounted within a recess of the seat back such that the fastening piece may be moved to various fixed positions corresponding to pairs of slots in the seat back for insertion of buckle tongues. Finally, the seat back itself may be made adjustable by making the upper portion of the seat back slidably mounted within the lower portion, with the seat back buckles mounted within the upper portion.

The current disclosure provides greater safety for children involved in a vehicle collision or accident. In addition to the safety benefits of conventional child safety seat designs, the present disclosure allows a child to be quickly and safely removed from the vehicle following an accident. In such an emergency situation time can be critical to the health and safety of anyone involved, especially children. This is particularly true in cases where fire is present or the possibility of an explosion and/or fire exists. The present disclosure addresses a safety concern not previously addressed by prior art devices.

The present disclosure more specifically discloses a child safety seat comprising: (a) a supporting base structure adapted to be secured to a vehicle seat; (b) a child seating surface wherein the seating surface comprises a seat bottom and a seat back, and wherein the seat back has disposed therein at least one pair of laterally spaced buckles (restraints); (c) a child restraint harness wherein the harness comprises a pair of shoulder restraint belts running from the laterally spaced buckles in the seat back to a seat bottom locking tongue, each shoulder restraint belt having a locking tongue (restraint engaging means) affixed to an extreme end of the belt for insertion into the laterally spaced pair of buckles in the seat back, and a buckle affixed to the front center portion of the seat bottom for receiving the seat bottom locking tongue; and (d) an emergency means of disengaging the pair of shoulder restraint belt locking tongues from the seat back buckles, the disengaging means being actuated from the rear face of the seat back.

The subject disclosure also reveals a child safety seat comprising: (a) a supporting base structure adapted to be secured to a vehicle seat; (b) a child seating surface wherein the seating surface comprises a seat bottom and a seat back, and wherein the seat back comprises an unmovable bottom piece and a slidably adjustable top piece overlying the bottom piece, the bottom piece having laterally spaced vertical tracks, and the top piece having laterally spaced vertical recesses that secure the top piece to the bottom piece allowing the seat back to travel along the tracks and to be extended to varying fixed heights; (c) a pair of laterally spaced buckles disposed within the top piece of the seat back; (d) a child restraint harness wherein the harness comprises a pair of shoulder restraint belts running from the laterally spaced buckles in the seat back to a seat bottom locking tongue, each shoulder restraint belt having a locking tongue affixed to an extreme end of the belt for insertion into the laterally spaced pair of buckles in the seat back, and a buckle affixed to the front center portion of the seat bottom for receiving the seat bottom locking tongue; and (d) an emergency means of disengaging the pair of shoulder restraint belt locking tongues from the seat back buckles, the disengaging means being actuated from the rear face of the seat back.

The present disclosure further discloses a child safety seat comprising: (a) a supporting base structure adapted to be secured to a vehicle seat; (b) a child seating surface wherein the seating surface comprises a seat bottom and a seat back, and wherein the seat back contains at least one pair of laterally spaced slots and wherein the seat back includes a recessed channel running vertically on the rear face of the seat back having laterally spaced tracks running vertically within the recess; (c) a slidably mounted fastening piece wherein the fastening piece includes a recess on each extreme end for securing the fastening piece into the seat back recess and onto the laterally spaced tracks, and wherein the fastening piece has two buckles disposed therein so as to coincide with the laterally spaced pair of slots in the seat back, and a means of locking the fastening piece into various fixed positions coinciding with the pairs of slots in the seat back; (d) a child restraint harness wherein the harness comprises a pair of shoulder restraint belts running from the laterally spaced slots in the seat back to a seat bottom locking tongue, each shoulder restraint belt having a locking tongue affixed to an extreme end of the belt for insertion into the laterally spaced pair of buckles in the fastening piece, and a buckle affixed to the front center portion of the seat bottom for receiving the seat bottom locking tongue; and (e) an emergency means of disengaging the pair of shoulder restraint belt locking tongues from the fastening piece buckles, the disengaging means being actuated from the rear face of the seat back.

The present disclosure further reveals a child safety seat comprising: (a) a supporting base structure adapted to be secured to a vehicle seat; (b) a child seating surface wherein the seating surface comprises a seat bottom and a seat back, and wherein the seat back has disposed therein at least one pair of laterally spaced shoulder belt restraints; (c) a child harness wherein the harness comprises a pair of shoulder belts running from the restraints in the seat back to a seat bottom locking tongue, each shoulder belt having a restraint engaging means affixed to an extreme end of the belt for insertion into the laterally spaced pair of restraints in the seat back, and a buckle affixed to the front center portion of the seat bottom for receiving the seat bottom locking tongue; and (d) an emergency means of disengaging at least one of shoulder belts from at least one of the restraints in the back of the seat, the disengaging means being actuated from the rear face or side of the seat.

The subject disclosure also discloses a child safety seat comprising: (a) a supporting base structure adapted to be secured to a vehicle seat; (b) a child seating surface wherein the seating surface comprises a seat bottom and a seat back, and wherein the seat back comprises an unmovable bottom piece and a slidably adjustable top piece overlying the bottom piece, the bottom piece having laterally spaced vertical tracks, and the top piece having laterally spaced vertical recesses that secure the top piece to the bottom piece allowing the seat back to travel along the tracks and to be extended to varying fixed heights; (c) a pair of laterally spaced restraints disposed within the top piece of the seat back; (d) a harness wherein the harness comprises a pair of shoulder belts running from the laterally spaced restraints in the seat back to a seat bottom locking tongue, each shoulder belt having a locking tongue affixed to an extreme end of the belt for insertion into the laterally spaced pair of restraints in the seat back, and a buckle affixed to the front center portion of the seat bottom for receiving the seat bottom locking tongue; and (d) an emergency means of disengaging at least one of the shoulder belts from the laterally spaced restraints in the seat back, the disengaging means being actuated from the rear face or side of the seat.

The present disclosure further reveals a child safety seat comprising: (a) a supporting base structure adapted to be secured to a vehicle seat; (b) a child seating surface wherein the seating surface comprises a seat bottom and a seat back, and wherein the seat back contains at least one pair of laterally spaced slots and wherein the seat back includes a recessed channel running vertically on the rear face of the seat back having laterally spaced tracks running vertically within the recess; (c) a slidably mounted fastening piece wherein the fastening piece includes a recess on each extreme end for securing the fastening piece into the seat back recess and onto the laterally spaced tracks, and wherein the fastening piece has two restraints disposed therein so as to coincide with the laterally spaced pair of slots in the seat back, and a means of locking the fastening piece into various fixed positions coinciding with the pairs of slots in the seat back; (d) a harness wherein the harness comprises a pair of shoulder belts running from the laterally spaced slots in the seat back to a seat bottom locking tongue, each shoulder belt having a restraint engaging means affixed to an extreme end of the belt for insertion into the laterally spaced pair of buckles in the fastening piece, and a buckle affixed to the front center portion of the seat bottom for receiving the seat bottom locking tongue; and (e) an emergency means of disengaging at least one of the shoulder belts from at least one of the restraints disposed in the fastening piece, the disengaging means being actuated from the rear face or the side of the seat.

BRIEF DESCRIPTION OF DRAWINGS

A more complete understanding of the disclosure and its advantages will be apparent from a review of the Detailed Description in conjunction with the following Drawings, in which:

FIG. 1 is a perspective view of the child safety seat of the present disclosure with a slide handle emergency release mechanism.

FIG. 2 is a perspective view of the slide handle emergency means of disengaging the child safety seat shoulder restraints.

FIG. 3 is a side profile view of the child safety seat of the present disclosure with a slide handle emergency release mechanism.

FIG. 4 is a front view of the child safety seat of the present disclosure.

FIG. 5 is a sectional view of the child safety seat of the present disclosure taken along line 5-5 of FIG. 4.

DETAILED DESCRIPTION OF THE DISCLOSURE

Figure 6:
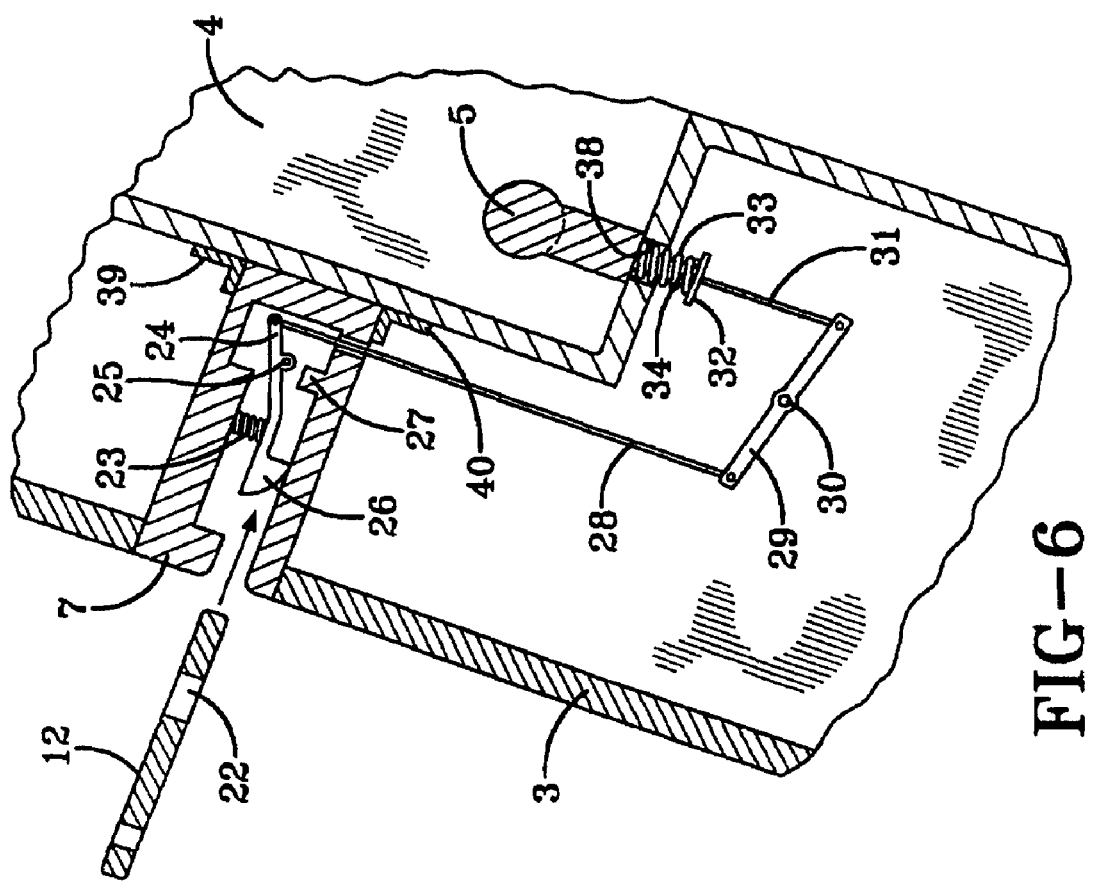
FIG. 6 is an enlarged sectional view of one embodiment of the slide handle emergency disengaging mechanism.

The present disclosure provides a child safety seat can be used in a wide variety of vehicles including automobiles, trucks, buses, aircraft and boats. In one exemplary embodiment of the present disclosure, a child safety seat comprises: (a) a supporting base structure adapted to be secured to a vehicle seat; (b) a child seating surface wherein the seating surface comprises a seat bottom and a seat back, and wherein the seat back has disposed therein at least one pair of laterally spaced buckles; (c) a child restraint harness wherein the harness comprises a pair of shoulder restraint belts running from the laterally spaced buckles in the seat back to a seat bottom locking tongue, each shoulder restraint belt having a locking tongue affixed to an extreme end of the belt for insertion into the laterally spaced pair of buckles in the seat back, and a buckle affixed to the front center portion of the seat bottom for receiving the seat bottom locking tongue; and (d) an emergency means of disengaging the pair of shoulder restraint belt locking tongues from the seat back buckles, the disengaging means being actuated from the rear face of the seat back. Some child seats of this type are depicted in U.S. patent application Ser. No. 11/879,984, filed on Jul. 19, 2007. The teachings of U.S. patent application Ser. No. 11/879,984 are incorporated herein by reference in their entirety.

Referring to FIG. 1 a perspective drawing is shown of one embodiment of the child safety seat. There are many variations of child safety seats commercially available and the current disclosure may be adapted to include elements of existing designs known to those skilled in the art. The embodiment shown has a supporting base structure 1 that underlies a seat bottom 2. The base structure 1 and seat bottom 2 are designed to slope toward the rear of the seat where the seat back 3 extends approximately vertically from the low end of the seat bottom 2. The angle between the seat bottom 2 and the seat back 3 is approximately a right angle. The slope of the base structure 1 and seat bottom 2 may vary, but should be set so as to make the seat as comfortable as possible for a child secured therein.

The base structure 1 can be of any conventional design and material known in the art that will support the child seating surface 2 and 3 as well as provide a means of securing the child safety seat to the vehicle seat. Federal regulations now require all forward child safety seats to be equipped with LATCH (Lower Anchors and Tethers for Children). A LATCH system eliminates the need to use a vehicle seat belt and was designed to standardize installation of child safety seats. The LATCH requirement also applies to certain vehicles, requiring them to include metal anchors for the lower anchors and tethers of the child safety seats. The present disclosure may be adapted to be secured via a LATCH system, or may be adapted to be secured with an existing vehicle seat belt for vehicles that are not equipped with LATCH anchors. The seat bottom 2 may also be of any conventional design. In the embodiment shown in the drawings the base structure 1 is of cylindrical metal or plastic tubing. The seat bottom 2 is normally constructed of plastic and a form of foam padding is typically adhered to the seating surface of the seat bottom 2 and covered with a durable fabric to increase the comfort of the child safety seat. The seat back 3 is generally constructed of a plastic material and is hollow, allowing enough space inside the seat back 3 for a pair of buckles 6 to be disposed therein, as well as allowing for a vertical recess 4 on the rear surface of the seat back 3 such that the emergency disengaging means 5 is accessible while the seat back 3 is flush with a vehicle seat. In the embodiment shown in FIGS. 1-6 the disengaging mechanism 5 is located at the bottom of the vertical recess 4.

The child safety seat of the present disclosure includes a harness system for securing the child into the seat. The harness system has a seat bottom buckle 10 attached to the front of the seat bottom 2. A buckle tongue 35 that is attached to the end of a pair of shoulder restraint belts 8 and 9 is inserted into the seat bottom buckle 10 to secure the child into the safety seat. The shoulder restraint belts 8 and 9 each have an additional buckle tongue 36 and 37 attached at the opposite extreme end for insertion into the seat back buckles 6 and 7. There are many variations of the child safety seat harness system available commercially, any of which may be substituted for the design disclosed in the embodiments shown herein, provided that the prior art design is modified to include the critical elements of the disclosure now claimed. The harness system and child safety seat shown by FIG. 4 are exemplary, and other configurations of the harness system and the child seat are possible.

Referring to FIG. 6 the internal structure of the emergency disengaging means is illustrated. The disengaging means 5 is mounted on the bottom surface of the seat back recess 4. In this embodiment the disengaging means is a pull handle that actuates the mechanism when pulled upwards in a path approximately parallel to the rear surface of the seat back. The disengaging means could be any conventional method known to those skilled in the art including a pull handle, a push button, a lever handle, and a turnable knob. It is important that the emergency disengaging mechanism be designed so that it will not be actuated due to every day use of the child safety seat, such as in moving the seat from one vehicle to another vehicle. It is also important that the disengaging mechanism be positioned so as to prevent a child occupant of the child safety seat from actuating the mechanism and releasing the shoulder restraints while secured therein. The internal components that act to transfer the input motion of the emergency disengaging means to the seat back buckles thereby releasing the shoulder restraint tongues may be of any conventional design. Such mechanical systems are well known to persons skilled in the art and the present disclosure may be adapted to include any such system obvious to a person of ordinary skill in the art.

In the embodiment shown a cylindrical shaft 34 extends from the bottom of the pull handle through a cylindrical opening 38 in the seat back. The shaft has a cylindrical bottom plate 32 attached at its bottom extreme end of a diameter larger than that of the opening 38 so as to prevent the pull handle 5 from being removed from the seat back 3. A spring 33 on the cylindrical shaft 34 between the bottom plate 32 and the pull handle 5 acts to bias the mechanism to an engaged position. Another spring 23 located within the seat back buckle also acts to bias the buckle to an engaged position. A wire 31 connects the pull handle shaft 33 to an extreme end of a pivoting lever 29 which pivots around a rod 30. A second wire 28 is affixed to the opposite end of the pivoting lever 29 and connects the lever to an extreme end of the buckle latch 24 within the seat back buckle. The buckle latch 26 also pivots on a rod 25. The engaging end of the latch 26 fits within the latching hole 22 of the shoulder restraint tongue 12 when the tongue 12 is inserted into the buckle 7. A tongue stop 27 acts to prevent the shoulder restraint tongue 12 from moving towards the rear face of the seat back 3 when the buckle latch 24 is engaged with the shoulder restraint tongue 12. The engaging end of the latch 26 is shaped so as to allow the shoulder restraint tongue 12 to be inserted into the buckle 7 without impeding the tongue's forward motion. The seat back buckle 7 is mounted to the inner rear face of the seat back 3 with mounting brackets 39 and 40.

When the emergency disengaging means 5 is actuated the pull handle wire 31 causes the lever 29 to pivot, thereby exerting a downward force on the latch wire 28 causing the latch 26 to pivot around the rod 25. When the latch 26 pivots it disengages the shoulder restraint tongue 12 allowing it to be removed from the buckle 7. When the emergency disengaging means is released the two springs 33 and 23 act to return the buckle latch to an engaged position. The shoulder restraint tongue 12 may be reinserted into the buckle 7 following actuation of the emergency disengaging mechanism to return the system to its normal operating state. This allows the emergency disengaging mechanism of a single child safety seat to be actuated any number of times in actual automobile accidents or to practice emergency procedures without having to purchase a new child safety seat.

The mechanical system for transferring the input energy applied to the release mechanism to the seat back buckles operates in such a way as to actuate both seat back buckles simultaneously. However, FIG. 6 shows the disengaging means of the present disclosure actuating only one of the seat back buckles. Many adaptations to the system shown are possible for transferring the input force to both buckles that would be obvious to a person skilled in the art. In the embodiment shown the two buckles are actuated simultaneously by connecting a second latch wire to the lever 29 at the same point of attachment as the latch wire 28 shown. This second latch wire, when connected to a second latch, would actuate both buckles simultaneously with a single pull of the emergency disengaging mechanism. The second buckle not displayed in the drawing operates in exactly the same manner is the buckle depicted.

Figure 8:
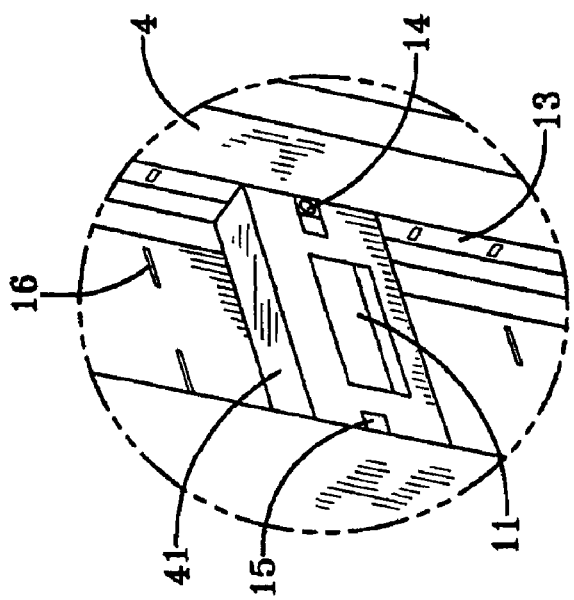
FIG. 8 is a perspective view of the slidable fastening piece.
Figure 7:
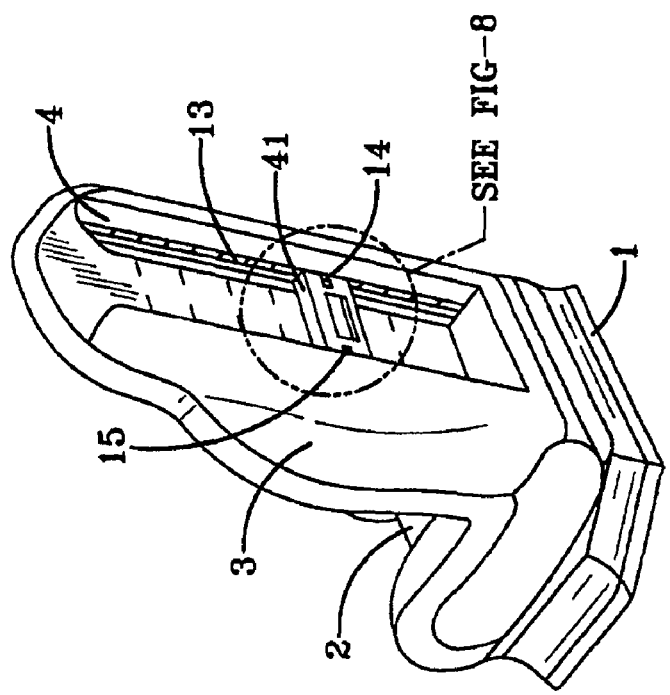
FIG. 7 is a perspective view of an alternative embodiment of the child safety seat of the present disclosure having a slidable fastening piece on the rear face of the seat back.

FIGS. 7 and 8 show an alternative embodiment of the present disclosure. In this alternative embodiment multiple pairs of slots 16 are located in the seat back 3. A fastening piece 41 is slidably mounted in tracks 13 running vertically in the vertical recess 4 of the seat back 3. The fastening piece 41 slides within the tracks 13 to various fixed positions that correspond to the pairs of slots 16 in the seat back. Two latches 14 and 15 operate to fix the fastening piece 41 at each fixed position within the tracks 13, and when actuated allow the fastening piece 41 to slide to a different position. In this embodiment the seat back buckles 6 and 7 are mounted within the fastening piece 41 such that the shoulder restraint tongues 36 and 37 may be inserted through the pair of seat back slots 16 that are aligned with the fastening piece 41 to engage the buckles. The emergency disengaging means is a lever handle mechanism 11. To actuate the disengaging means the lever handle 11 is pulled in a direction approximately perpendicular to the rear face of the seat back 3, thereby disengaging the seat back buckles 6 and 7. This embodiment of the child safety seat allows for adjustment of the height of the shoulder restraint belts 8 and 9 to accommodate varying sized children.

Figure 12:
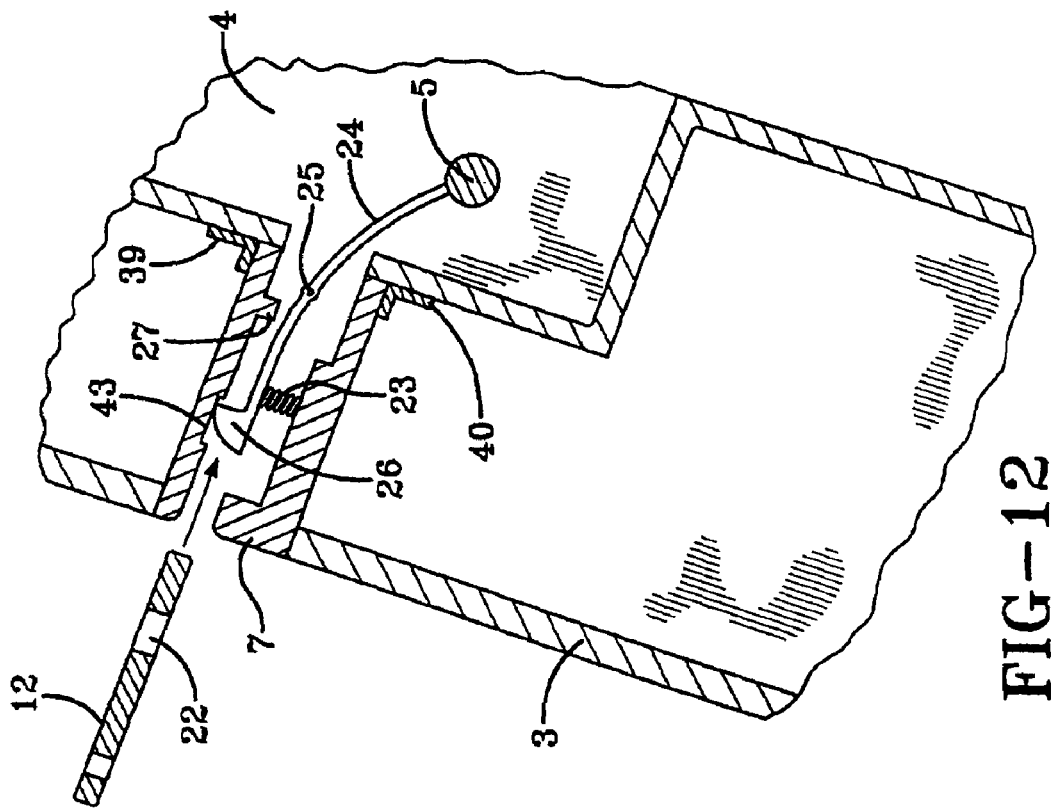
FIG. 12 is an enlarged sectional view of the emergency disengaging mechanism of FIG. 11.
Figure 11:
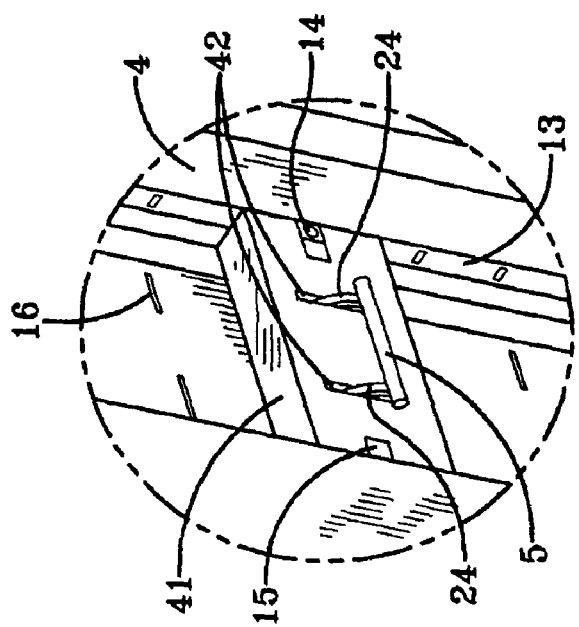
FIG. 11 is a perspective view of the child safety seat of FIG. 7 with an alternative emergency disengaging mechanism.

FIGS. 11 and 12 show an alternative emergency release mechanism used with the embodiment of the present disclosure having a slidable fastening piece. The seat back buckles and emergency release mechanism are contained within the slidable fastening piece. This embodiment has the advantages of simplicity and the use of minimal components, decreasing possible failure points and allowing for more cost effective manufacture. The disengaging means is a pull handle 5 that connects to both buckle latches 24 that extend through openings 42 of the seat back. The openings in the seat back 42 are vertical slots which allow the buckle latches 24 to move from an engaged position upward to a disengaged position. The buckle latches 24 pivot on a rod 25. The rod 25 may be a single rod extending between both seat back buckles 6 and 7 or two smaller rods, each contained within a single seat back buckle. The position of the rod 25 in the buckle latch 24 may be adjusted to increase or decrease the length of the lever arm between the pivot point and the handle 5, thereby adjusting the amount of force required to actuate the release mechanism and the distance the handle must travel to disengage the shoulder restraint tongue 12. The shape of the portion of the buckle latch protruding through the seat back is a downward arc such that only a force applied approximately parallel to the seat back will actuate the release mechanism. This design will reduce the risk of unintended actuation of the release mechanism. A spring 23 acts to bias the buckle latch 24 in an engaged position.

The engaging end of the latch 26 fits within the latching hole 22 of the shoulder restraint tongue 12 when the tongue 12 is inserted into the buckle 7. The engaging end of the latch 26 extends through the latching hole 22 into a recess in the seat back buckle 43, thereby increasing the distance the engaging end 26 must travel before disengaging the restraint tongue 12 and decreasing the likelihood that the tongue 12 may disengage due to vibrations or other forces acting upon the safety seat. A tongue stop 27 acts to prevent the shoulder restraint tongue 12 from moving towards the rear face of the seat back 3 when the buckle latch 24 is engaged with the shoulder restraint tongue 12. The engaging end of the latch 26 is shaped so as to allow the shoulder restraint tongue 12 to be inserted into the buckle 7 without impeding the tongue's forward motion. The seat back buckle 7 is mounted to the inner rear face of the seat back 3 with mounting brackets 39 and 40.

Figure 10:
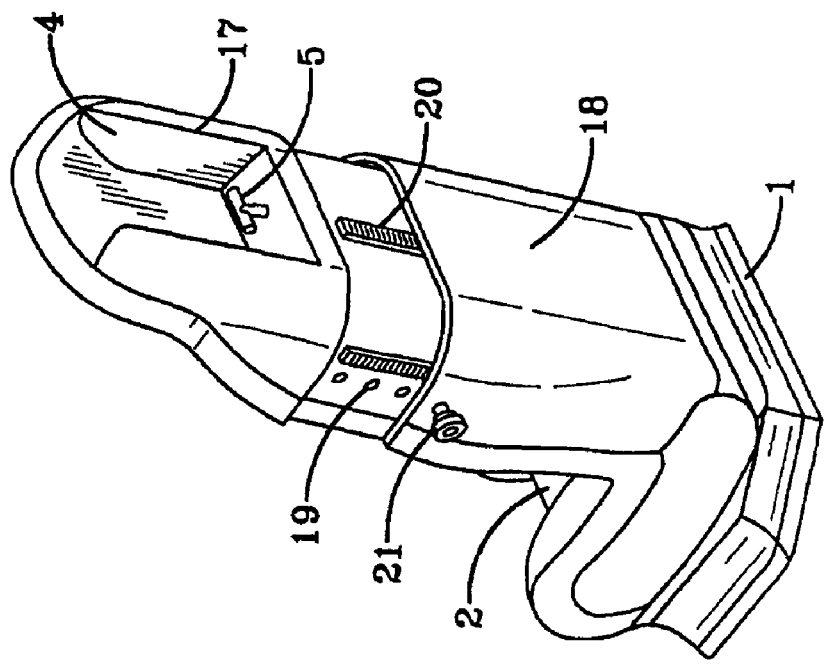
FIG. 10 is a perspective view of the child safety seat as shown in FIG. 9 with the seat back extended upwards.
Figure 9:
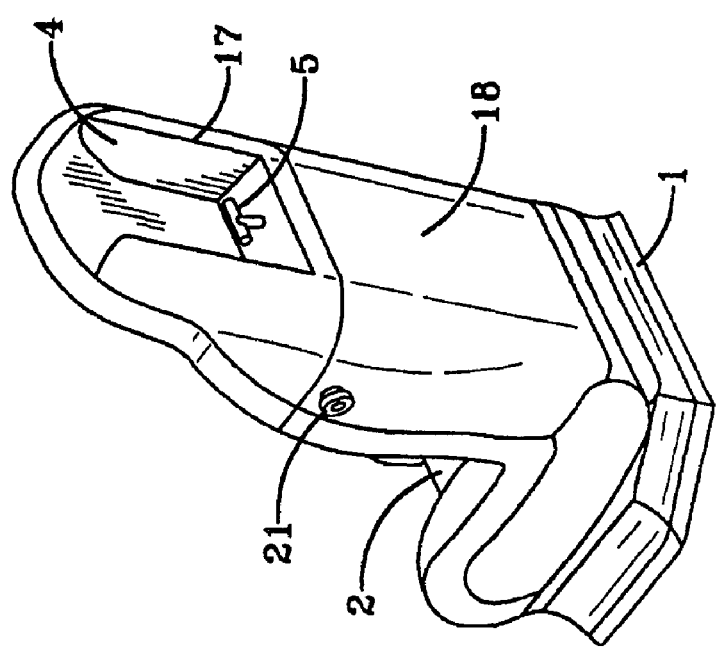
FIG. 9 is a perspective view of an alternative embodiment of the child safety seat of the present disclosure that has a slidably adjustable seat back.

FIGS. 9 and 10 show an additional alternative embodiment of the present disclosure. In this embodiment of the child safety seat the seat back 3 is composed of a slidably adjustable top piece 17 and an unmovable bottom piece 18. The bottom piece 18 has laterally spaced vertical tracks and the top piece 17 has laterally spaced vertical recesses 20 that secure the top piece 17 to the bottom piece and allow the top piece 17 to extend to various fixed heights. The seat back buckles 6 and 7 are mounted with the top piece 17 so that by extending the seat back 3 the child safety seat can accommodate larger children. A latch device 21 is mounted on the rear face of the seat back 3 to secure the top piece 17 in position, and latching holes 19 run vertically on the top piece 17, each hole representing a fixed height for the seat back 3. The emergency disengaging means is a pull handle as illustrated in FIG. 6. This embodiment also allows for adjustment of the height of the shoulder restraint belts 8 and 9 so that the child safety seat can accommodate varying sizes of children.

Figure 14:
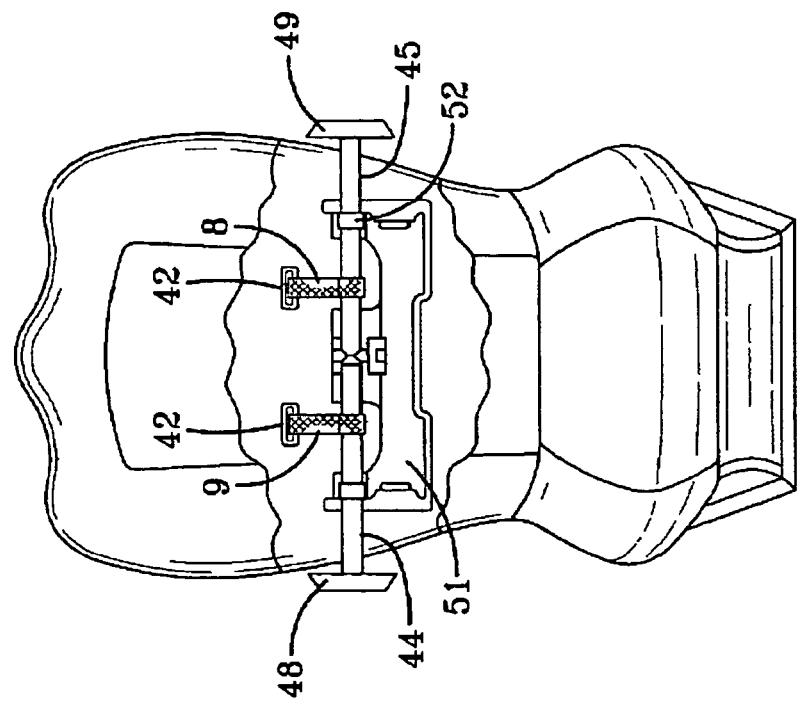
FIG. 14 is a perspective back view of the child safety seat depicted in FIG. 13 with an alternative emergency disengaging mechanism.
Figure 13:
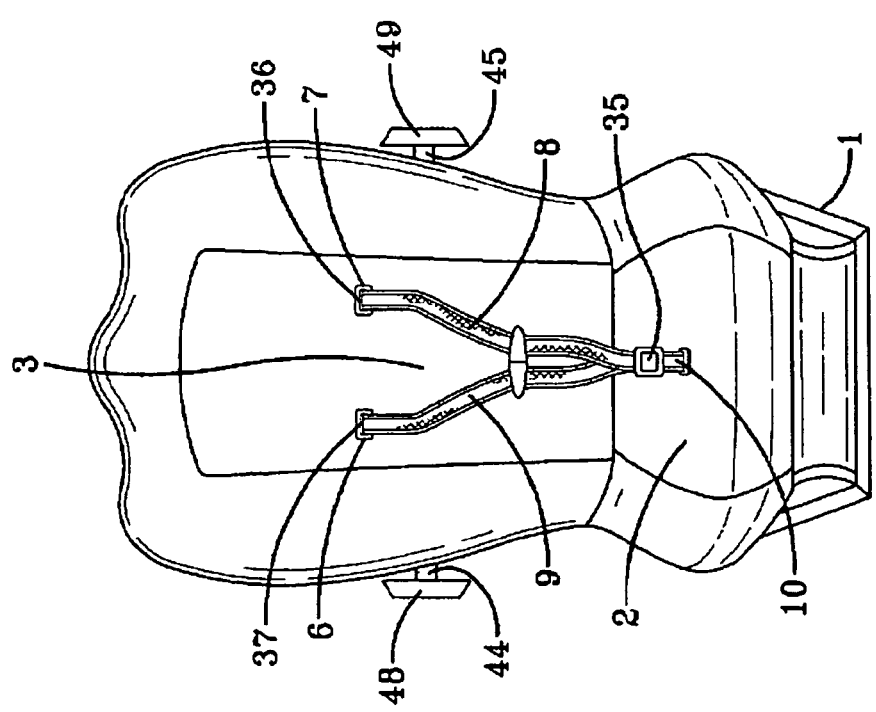
FIG. 13 is a perspective front view of the child safety seat with an alternative emergency disengaging mechanism.
Figure 15:
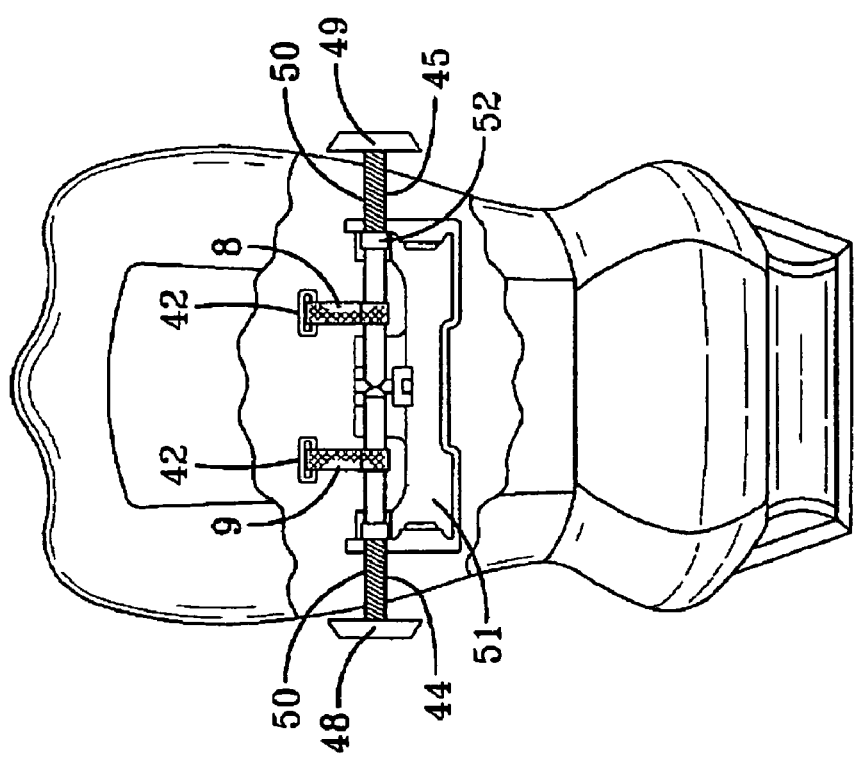
FIG. 15 is a perspective back view of the child safety seat depicted in FIG. 13 with an alternative emergency disengaging mechanism that is utilizes springs as a tensioning device.

Another embodiment of this disclosure is depicted in FIGS. 13-15. In this embodiment of the disclosure the restraints used to secure the shoulder belts 8 and 9 to the seat back are pins 44 and 45. In this scenario the restraint engaging means are typically loops 46 which are located at the extreme ends of the shoulder belts 8 and 9. The pins engage and restrain the shoulder straps by being inserted through the loops 46 at the extreme ends of the shoulder belts. Normally handles 48 and 49 are affixed to the outer end of the pins. The pins are held in position by a mounting bracket 51 which is equipped with pin guides 52. By pulling on the handle the pins can be withdrawn from the loops at the ends of the shoulder straps 8 thereby disengaging the shoulder belts from the restraint. Then, that shoulder strap no longer holds the child in the safety seat and the child can be removed by simply lifting the child upwardly and outwardly in the direction of the freed shoulder belt. In this regard, the lifting of the child pulls the end of the shoulder strap previously engaged with the restraint through the child seat opening 42, and the disengaged shoulder strap no longer restricts movement of the child. It should be noted that disengaging one of the shoulder belts is sufficient to free a child from the safety seat. However, in some cases it may be convenient and more efficient to disengage both shoulder belts before attempting to remove the child from the safety seat.

It should be noted that in this design the pins extend through the sides of the safety seat to handles 48 and 49 which are located on the sides of the seat. It is typically preferred for the pins to be held in place in a position that engages and restrains the shoulder belts by a tensioning devise. The tensioning device should be effective to keep the pin from becoming disengaged from the shoulder belt through vibration, acceleration and/or deceleration associated with movement of the vehicle in which the child safety sear is installed. It should also prevent the pins from becoming disengaged from the shoulder belt accidentally if bumped or jarred by adults or other children in the vehicle. The tensioning device can be a clip, a latch or a spring 50 as shown in FIG. 15.

The simplistic design illustrated in FIGS. 13-15 offers the advantage of low manufacturing cost and minimizes the number of moving parts. This reduces the risk of mechanical failure and can lead to a longer product life cycle. This design also offers the advantage of an emergency safety release being located on both sides of the child safety seat. This can be advantageous in an emergency situation in cases where one side of the seat is obstructed and in situations where the safety release on one side of the seat is jammed. In other words, this design offers additional safety through redundancy.

An emergency seat belt release for adults that may be trapped in vehicles after an accident is also contemplated. In this embodiment of the disclosure the emergency seat belt release is built into a vehicle seat having an integrated seat belt system. For instance, the vehicle can have seats and a seat belt system that is built into the vehicle, wherein the emergency seat belt release is integrated into the seat belt system of the vehicle. In the case of vehicle seats that are adapted for adult seating it is desirable for the emergency release to be located in an area of the vehicle that is within the reach of the adult occupant of the seat. It is convenient for this emergency release to be located at the lower front of the seat, at a lower side surface of the seat, or on the floor of the vehicle in proximity to the seat. The emergency seat belt release of this embodiment of the disclosure can be integrated into conventional three point seat belt systems that are commonly used in motor vehicles today.

Three point seat belt systems are typically comprised of a shoulder belt, a lap belt, a seat belt tongue, and a seat buckle. In such three point seat belt systems one end of the lap belt and one end of the shoulder belt are joined together at or in proximity to the seat belt tongue. The shoulder belt typically passes around a "D" ring which is mounted to the "B" pillar of a motor vehicle (the vertical structural member separating the front and rear doors of a four-door vehicle). The other end of the lap belt is typically mounted to the floor pan of the vehicle or to the seat cushion frame. The seat belt buckle is adapted for receiving the seat belt tongue and is also typically mounted directly or indirectly to the floor pan of the vehicle or to the seat cushion frame at the opposite side of the seat from which the lap belt is mounted. Such a three point seat belt system is illustrated in United States Patent Application Publication No. 2006/0208124 A1 which is titled "Dual Spool Retractor Seat Belt System." The teachings of United States Patent Application Publication No. 2006/0208124 A1 are incorporated herein by reference for the purpose showing a type of three point seat belt system into which the emergency release of this disclosure can be integrated. An early three point seat belt system is also illustrated in U.S. Pat. No. 3,043,625 which is titled "Safety Belt." The teachings of U.S. Pat. No. 3,043,625 are also incorporated herein by reference for the purpose of illustrating another three point seat belt system into which the emergency release of this disclosure can be integrated.

The emergency safety release of this disclosure is integrated into three point seat belt systems in a manner whereby the safety release can disconnect the seat belt buckle from its point of attachment to the vehicle. This point of attachment is typically on the vehicle floor pan or the seat cushion frame. This disclosure more specifically discloses a vehicle having an integrated seat belt system comprising: (a) a vehicle seat having a seat bottom, a seat back, and a seat cushion frame; (b) a three point seat belt system which is comprised of a shoulder belt, a lap belt, a seat belt tongue, and a seat buckle; wherein the seat buckle is mounted to vehicle, and wherein the three point seat belt system is adapted to restrain a human occupant in the case of an accident; and (c) an emergency means for disengaging the seat buckle from the point on which it is mounted to the vehicle. The seat buckle will typically be mounted to the vehicle by attaching it directly or indirectly to the vehicle floor pan or to the seat cushion frame. The means for actuation of the emergency release for disengaging the seat buckle from the point on which it is mounted to the vehicle will preferably be within easy reach of an adult occupant of the seat. The emergency release will preferably be located at the lower front of the seat, on a lower side surface of the seat, or on the floor of the vehicle in proximity to the seat.

While certain representative embodiments and details have been shown for the purpose of illustrating the subject disclosure, it will be apparent to those skilled in this art that various changes and modifications can be made therein without departing from the scope of the subject disclosure.

The invention claimed is:

1. A child safety seat comprising: (a) a supporting base structure adapted to be secured to a vehicle seat; (b) a child seating surface wherein the seating surface comprises a seat bottom and a seat back, and wherein the seat back has disposed therein at least one pair of laterally spaced shoulder belt restraints; (c) a child harness wherein the harness comprises a pair of shoulder belts running from the restraints in the seat back to a seat bottom locking tongue, each shoulder belt having a restraint engaging means affixed to an extreme end of the belt for insertion into the laterally spaced pair of restraints in the seat back, and a buckle affixed to the front center portion of the seat bottom for receiving the seat bottom locking tongue; and (d) an emergency means of disengaging at least one of shoulder belts from at least one of the restraints in the back of the seat, the disengaging means being actuated from the rear face or side of the seat.

2. A child safety seat as specified in claim 1 wherein the restraints include a pin.

3. A child safety seat as specified in claim 2 wherein the disengaging means is a handle that is attached to the end of the pin.

4. A child safety seat as specified in claim 3 wherein the restraint engaging means is a loop at the extreme end of the shoulder belts.

5. A child safety seat as specified in claim 4 wherein the pin is held in a position that restrains the shoulder belt by a spring.

6. A child safety seat as specified in claim 4 wherein the pin is held in a position that restrains the shoulder belt by a clip.

7. A child safety seat as specified in claim 4 wherein the pin is held in a position that restrains the shoulder belt by a latch.

8. A child safety seat as specified in claim 1 wherein the emergency means disengages both of the shoulder belts.

9. A child safety seat as specified in claim 8 wherein the child seating surface is detachable from the supporting base structure.

10. A child safety seat as specified in claim 9 wherein the seat back is slidably adjustable to accommodate varying sizes of children, wherein shoulder belts are adjustable in length to accommodate varying sizes of children, and wherein the disengaging means being actuated from the rear face of the seat.

11. A child safety seat comprising: (a) a supporting base structure adapted to be secured to a vehicle seat; (b) a child seating surface wherein the seating surface comprises a seat bottom and a seat back, and wherein the seat back comprises an unmovable bottom piece and a slidably adjustable top piece overlying the bottom piece, the bottom piece having laterally spaced vertical tracks, and the top piece having laterally spaced vertical recesses that secure the top piece to the bottom piece allowing the seat back to travel along the tracks and to be extended to varying fixed heights; (c) a pair of laterally spaced restraints disposed within the top piece of the seat back; (d) a harness wherein the harness comprises a pair of shoulder belts running from the laterally spaced restraints in the seat back to a seat bottom locking tongue; each shoulder belt having a locking tongue affixed to an extreme end of the belt for insertion into the laterally spaced pair of restraints in the seat back, and a buckle affixed to the front center portion of the seat bottom for receiving the seat bottom locking tongue; and (d) an emergency means of disengaging at least one of the shoulder belts from the laterally spaced restraints in the seat back, the disengaging means being actuated from the rear face or side of the seat.

12. A child safety seat as specified in claim 11 wherein the restraints include a pin.

13. A child safety seat as specified in claim 12 wherein the disengaging means is a handle that is attached to the end of the pin.

14. A child safety seat as specified in claim 13 wherein the restraint engaging means is a loop at the extreme end of the shoulder belts.

15. A child safety seat as specified in claim 14 wherein the pin is held in a position that restrains the shoulder belt by a spring.

16. A child safety seat as specified in claim 14 wherein the pin is held in a position that restrains the shoulder belt by a clip.

17. A child safety seat as specified in claim 14 wherein the pin is held in a position that restrains the shoulder belt by a latch.

18. A child safety seat as specified in claim 11 wherein the emergency means disengages only one of the shoulder belts.

19. A child safety seat as specified in claim 11 wherein the child seating surface is detachable from the supporting base structure.

20. A child safety seat comprising: (a) a supporting base structure adapted to be secured to a vehicle seat; (b) a child seating surface wherein the seating surface comprises a seat bottom and a seat back, and wherein the seat back contains at least one pair of laterally spaced slots and wherein the seat back includes a recessed channel running vertically on the rear face of the seat back having laterally spaced tracks running vertically within the recess; (c) a slidably mounted fastening piece wherein the fastening piece includes a recess on each extreme end for securing the fastening piece into the seat back recess and onto the laterally spaced tracks, and wherein the fastening piece has two restraints disposed therein so as to coincide with the laterally spaced pair of slots in the seat back, and a means of locking the fastening piece into various fixed positions coinciding with the pairs of slots in the seat back; (d) a harness wherein the harness comprises a pair of shoulder belts running from the laterally spaced slots in the seat back to a seat bottom locking tongue, each shoulder belt having a restraint engaging means affixed to an extreme end of the belt for insertion into the laterally spaced pair of buckles in the fastening piece, and a buckle affixed to the front center portion of the seat bottom for receiving the seat bottom locking tongue; and (e) an emergency means of disengaging at least one of the shoulder belts from at least one of the restraints disposed in the fastening piece, the disengaging means being actuated from the rear face or the side of the seat.

* * * * *